US012392640B2

(12) United States Patent
Song et al.

(10) Patent No.: US 12,392,640 B2
(45) Date of Patent: Aug. 19, 2025

(54) RECORDING SYSTEM FOR IMAGE AND SITE ABOUT DRIVE AND RECORDING METHOD FOR IMAGE AND SITE ABOUT DRIVE

(71) Applicant: BG T & A CO., Gunpo-si (KR)

(72) Inventors: Chi Hyung Song, Yongin-si (KR); Young Sung Kim, Yongin-si (KR); Tae Hyeon Noh, Anyang-si (KR)

(73) Assignee: BG T&A CO., Gunpo-si (KR)

( * ) Notice: Subject to any disclaimer, the term of this patent is extended or adjusted under 35 U.S.C. 154(b) by 156 days.

(21) Appl. No.: 18/342,546

(22) Filed: Jun. 27, 2023

(65) Prior Publication Data

US 2024/0011793 A1    Jan. 11, 2024

(30) Foreign Application Priority Data

Jul. 7, 2022   (KR) ...................... 10-2022-0084003

(51) Int. Cl.
*G01C 21/34*    (2006.01)
*G01C 21/00*    (2006.01)
*G06V 20/56*    (2022.01)

(52) U.S. Cl.
CPC ..... *G01C 21/3844* (2020.08); *G01C 21/3407* (2013.01); *G06V 20/56* (2022.01)

(58) Field of Classification Search
CPC ............ G01C 21/3844; G01C 21/3407; G01C 21/3647; G01C 21/3602; G06V 20/56; G07C 5/0866; G07C 5/02; H04N 5/77; H04N 21/8549
See application file for complete search history.

(56) References Cited

U.S. PATENT DOCUMENTS

| | | | | |
|---|---|---|---|---|
| 2022/0292971 | A1* | 9/2022 | Park | G06V 20/586 |
| 2024/0212404 | A1* | 6/2024 | Kang | G07C 5/0808 |
| 2024/0430384 | A1* | 12/2024 | Verghese | G08G 1/048 |

FOREIGN PATENT DOCUMENTS

| | | | | |
|---|---|---|---|---|
| JP | 2017-134577 A | 8/2017 | | |
| JP | 2019-8528 A | 1/2019 | | |
| KR | 10-2019-0130384 A | 11/2019 | | |
| KR | 10-2020-0062624 A | 6/2020 | | |
| KR | 10-2021-0117129 A | 9/2021 | | |
| KR | 20210117129 A | * | 9/2021 | G07C 5/0808 |

OTHER PUBLICATIONS

Machine translation (Year: 2021).*

* cited by examiner

*Primary Examiner* — Scott A Browne
*Assistant Examiner* — Lidia Kwiatkowska

(57) ABSTRACT

A recording system for an image and site about a drive includes a position information acquisition unit configured to acquire position information of a vehicle, a driving route generating unit configured to generate a driving route of the vehicle, based on a plurality of position information acquired while the vehicle is driving, an image capturing unit configured to image an external environment of the vehicle, an image recording unit configured to record a video captured while the vehicle is driving and position information on a capture position at which the video was captured, and a video mapping unit configured to map the video to a section route constituting at least a portion of the driving route, based on the position information on the capture position.

5 Claims, 4 Drawing Sheets

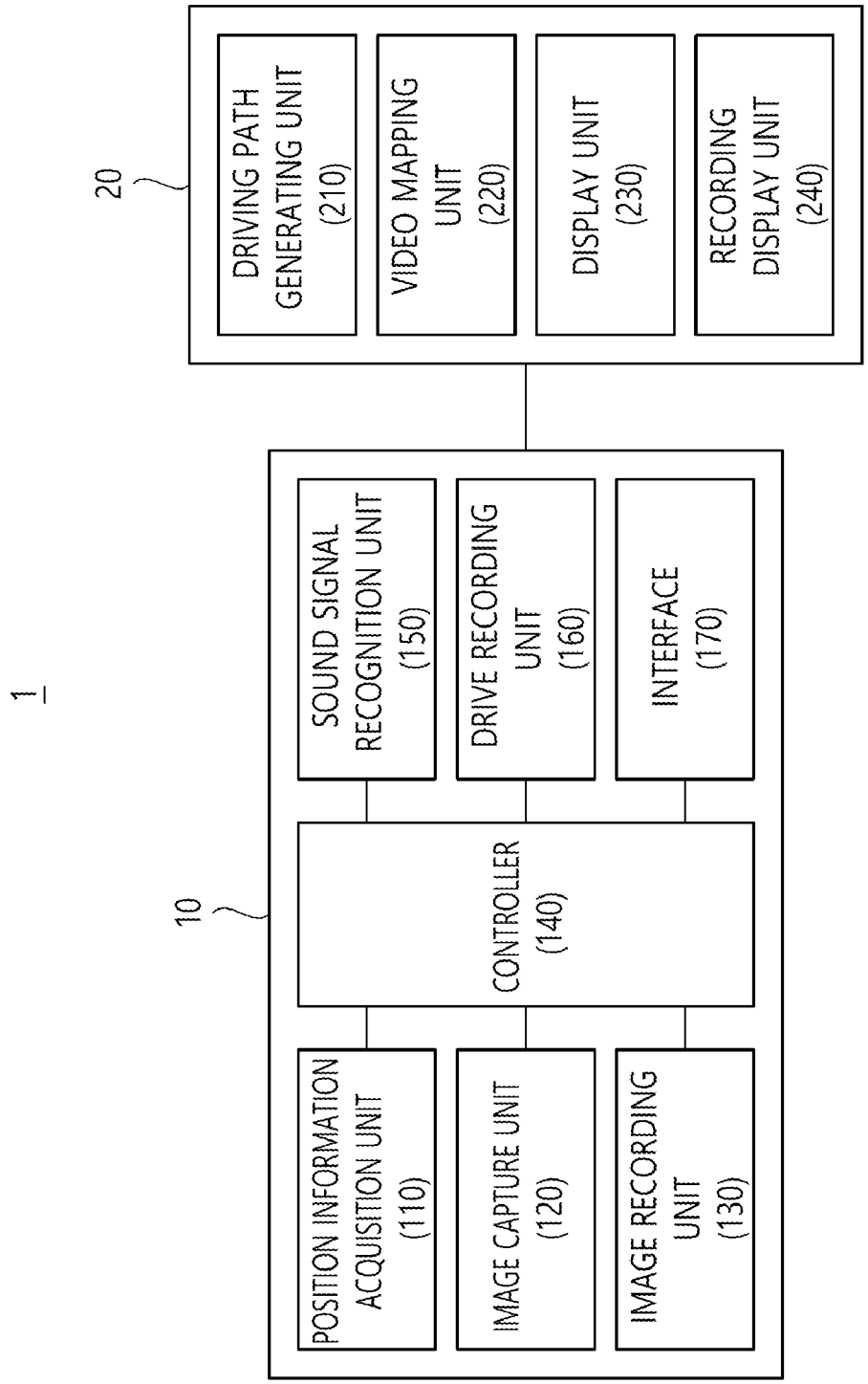

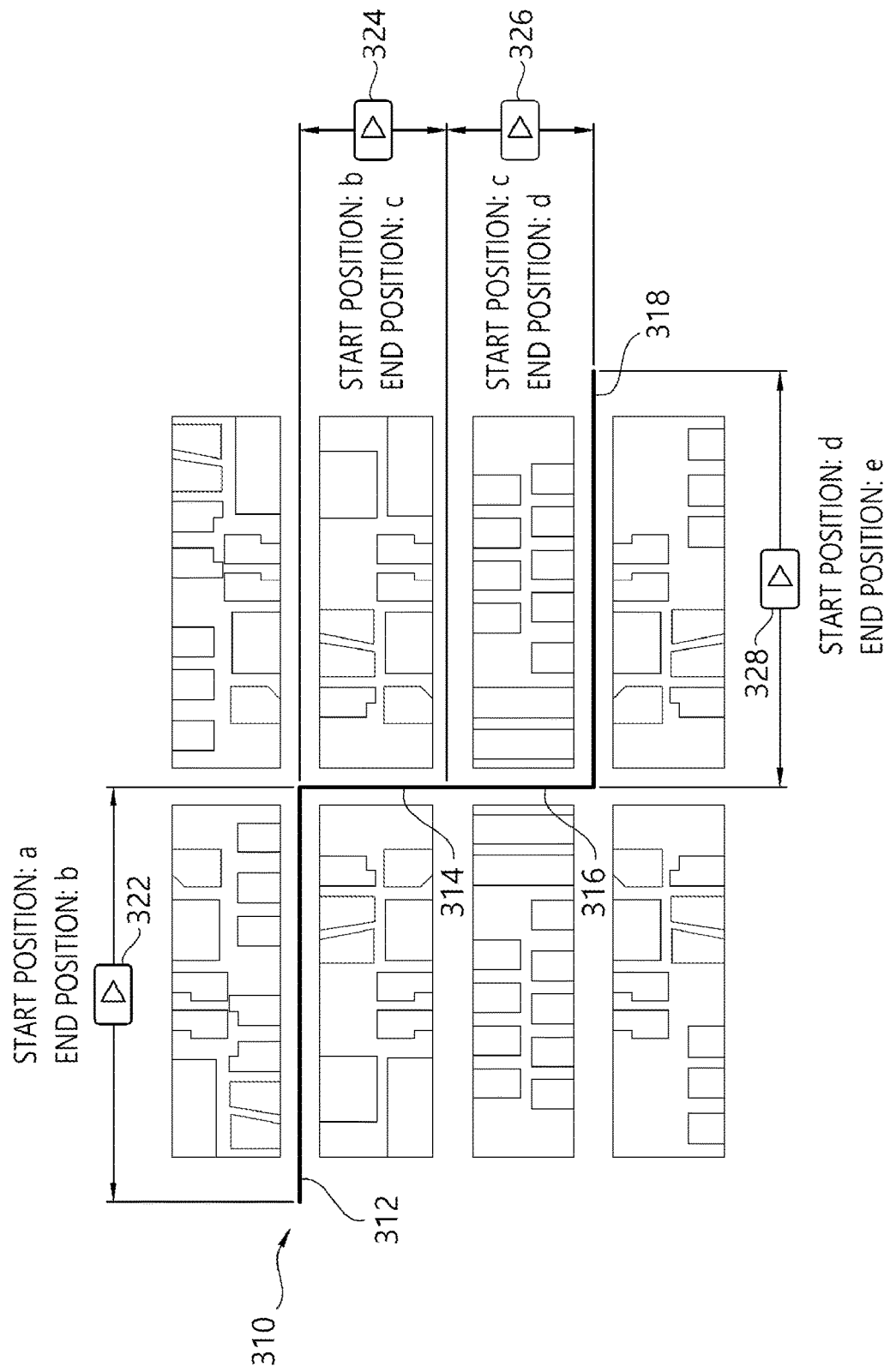

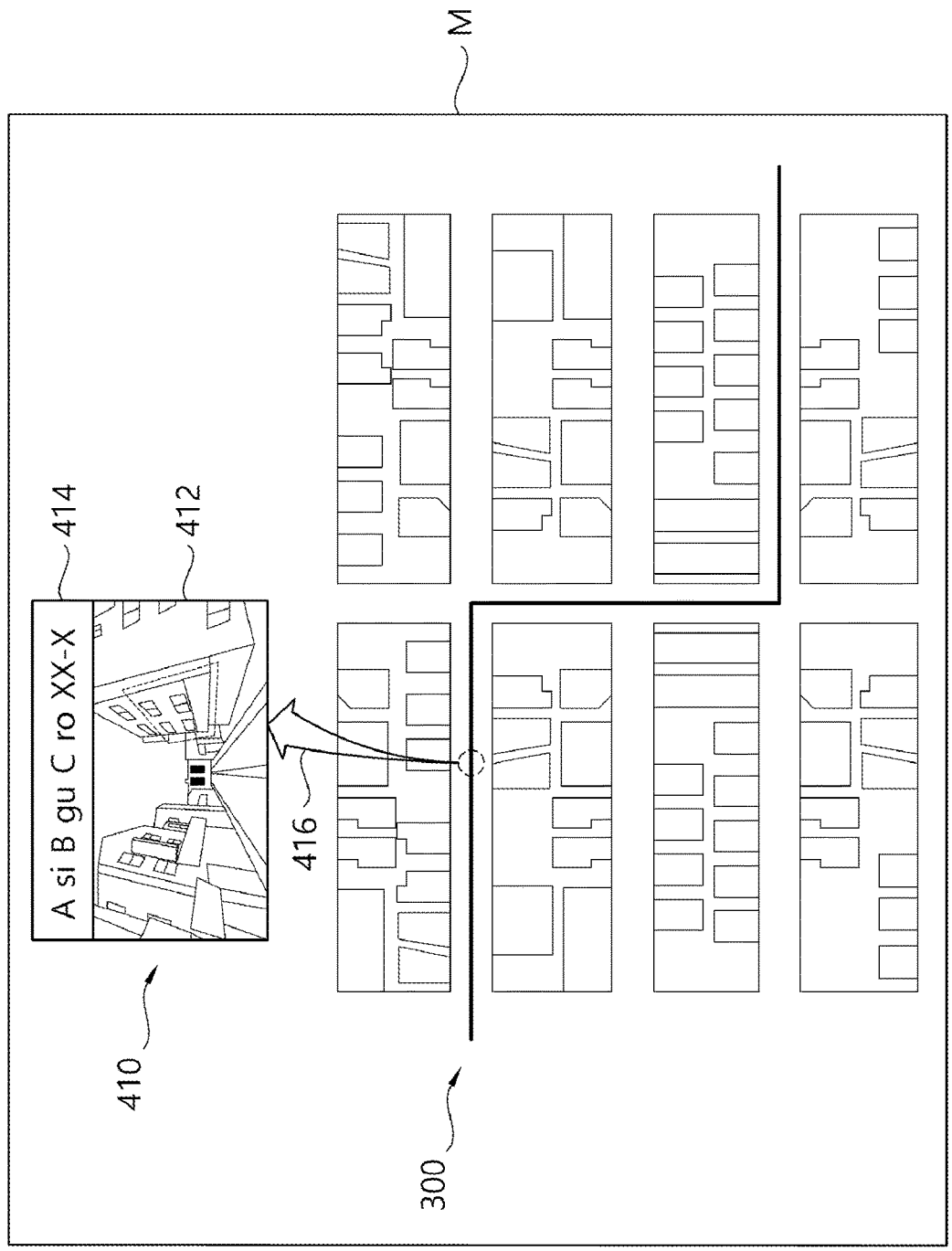

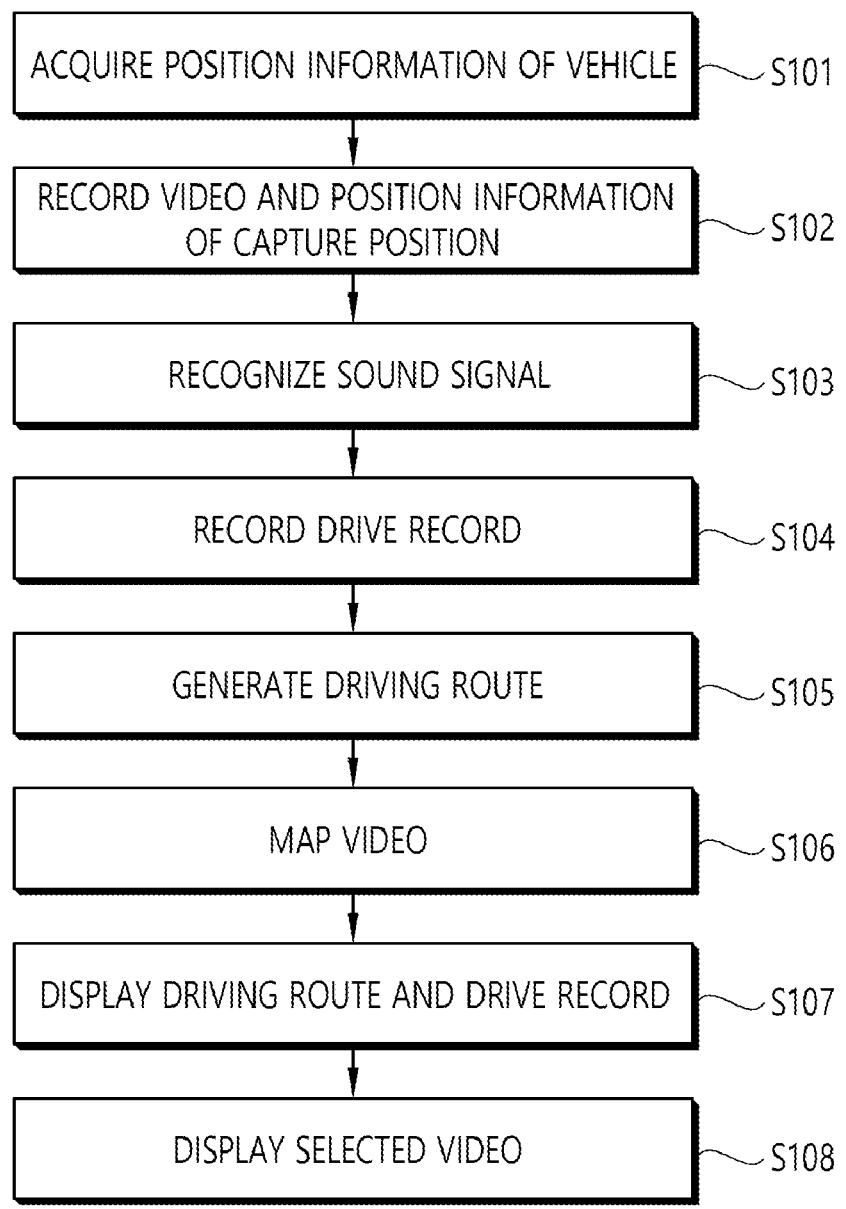

RECORDING SYSTEM FOR IMAGE AND SITE ABOUT DRIVE AND RECORDING METHOD FOR IMAGE AND SITE ABOUT DRIVE

CROSS-REFERENCE TO RELATED APPLICATIONS

This application claims the benefit of Korean Patent Application No. 10-2022-0084003, filed on Jul. 7, 2022, the contents of which are all hereby incorporated by reference herein in their entirety.

TECHNICAL FIELD

The present disclosure relates to a recording system for an image and site about a drive and a recording method for an image and site about a drive.

BACKGROUND

With the ubiquity of automobiles, many people enjoy driving as a leisure activity. While driving, people often encounter beautiful scenery and may want to revisit the region.

In this way, the places people hoped to revisit are usually places they encountered while on the move to other destinations. Therefore, people often do not know the addresses of these places. In addition, since many places with beautiful scenery may not have special landmarks, it is necessary for a user to memorize a travel route along which the user traveled in order to revisit these places, which is inconvenient.

Meanwhile, in general, a recording device, such as a black box or a dash cam, records an external environment during driving of a vehicle. The videos recorded in this way may be recorded on an auxiliary recording medium (SD card, etc.) with a time at the time of recording as a file name.

In this case, in order to find a video recorded in a specific section of a driving section, the user has to remember the time the video was recorded. However, this is difficult in reality, and in the end, the user has to play a plurality of videos one by one to find a desired video.

SUMMARY

The present disclosure provides a recording system for an image and site about a drive and a recording method for an image and site about a drive, capable of conveniently storing position information on a region encountered by a user during a drive.

The present disclosure also provides a recording system for an image and site about a drive and a recording method for an image and site about a drive, which allow a user to intuitively recognize a position in which recorded videos were captured.

The tasks of the present disclosure are not limited to the tasks mentioned above, and other tasks not mentioned will be clearly understood by those skilled in the art from the following description.

In an aspect, a recording system for an image and site about a drive includes: a position information acquisition unit configured to acquire position information of a vehicle; a driving route generating unit configured to generate a driving route of the vehicle, based on a plurality of position information acquired while the vehicle is driving; an image capturing unit configured to image an external environment of the vehicle; an image recording unit configured to record a video captured while the vehicle is driving and position information on a capture position at which the video was captured; and a video mapping unit configured to map the video to a section route constituting at least a portion of the driving route, based on the position information on the capture position.

The recording system may further include: a display unit configured to display the driving route on a screen, wherein the display unit displays the video mapped to the section route on the screen in response to an input for selecting the section route.

The video may include a plurality of driving videos sequentially captured by the image capture unit.

The capture position may include a start position of capturing the driving video and an end position of capturing the driving video.

Each of the plurality of driving videos may be mapped to the section route using position information at the start position and position information at the end position.

The recording system may further include: a sound signal recognition unit configured to recognize a sound signal; and a drive recording unit configured to record a drive record including position information of the vehicle at a time of recognizing the sound signal, based on the recognition of the sound signal.

The recording system may further include: a display unit configured to display the driving route on a screen; and a record display unit configured to display a record point, at which the sound signal is recognized in the driving route displayed on the screen, to be visually recognized, by using the position information included in the drive record.

Based on the recognition of the sound signal, the drive recording unit may record by further including an image captured at the time of recognition in the drive record.

The record display unit may output a thumbnail image on the screen using the image included in the drive record.

The thumbnail image may be displayed in association with the record point displayed on the screen.

The display unit may display the video mapped to the section route including the record point on the screen, in response to an input for selecting the thumbnail image.

The record display unit may display an address identified as position information included in the drive record, in association with the record point displayed on the screen.

In another aspect, a recording method for an image and site about a drive includes: acquiring position information of a vehicle; recording a video captured while the vehicle is driving and position information on a capture position at which the video was captured; generating a driving route of the vehicle, based on a plurality of position information acquired while the vehicle is driving; and mapping the video to a section route constituting at least a portion of the driving route, based on position information on the capture position.

Other specific details of the present disclosure are included in the detailed description and drawings.

According to embodiments of the present disclosure, at least the following effects are obtained.

Users may record locations of regions the user encounters, while driving.

Users may record a history of a car trip.

Users may intuitively recognize the places where recorded videos were captured.

In the event of a specific accident, it is easy to record images related to a position of the accident.

Effects according to the present disclosure are not limited by the contents exemplified above, and more various effects are included in this specification.

BRIEF DESCRIPTION OF THE DRAWINGS

FIG. 1 is a block diagram of a recording system for an image and site about a drive according to an embodiment of the present disclosure.

FIG. 2 is a diagram illustrating mapping of a video to a driving route by a recording system for an image and site about a drive according to an embodiment of the present disclosure.

FIG. 3 is a diagram schematically illustrating a driving route model and a cover image displayed on a screen of a display unit according to an embodiment of the present disclosure.

FIG. 4 is a flowchart of a recording method for an image and site about a drive according to an embodiment of the present disclosure.

DETAILED DESCRIPTION

Advantages and features of the present disclosure and implementation methods thereof will be clarified through following exemplary embodiments described with reference to the accompanying drawings. The present disclosure may, however, be embodied in different forms and should not be construed as limited to the embodiments set forth herein. Rather, these embodiments are provided so that this disclosure will be thorough and complete, and will fully convey the scope of the present disclosure to those skilled in the art, and the present disclosure is only defined by scopes of claims.

Exemplary embodiments of this specification invention will be described with reference to cross-sectional and and/or top plan views of the present disclosure. Therefore, a form of the drawings by production technology and/or an allowable error may be changed. In the drawings of the present disclosure, components may be exaggerated or reduced to easily understand for the convenience of description. Throughout the specification, like reference numerals denote the substantially same elements.

The meaning of 'mapping' mentioned below may refer to an operation of connecting certain data to corresponding data.

Hereinafter, the present disclosure will be described with reference to drawings illustrating a recording system for an image and site about a drive according to an embodiment of the present disclosure. FIG. 1 is a block diagram of a recording system for an image and site about a drive according to an embodiment of the present disclosure.

As shown in FIG. 1, a recording system 1 for an image and site about a drive according to an embodiment of the present disclosure may include a black box 10 and a user terminal 20. At this time, the configuration of the black box 10 and the user terminal 20 described below is to clarify the disclosure of the present disclosure, and the present disclosure is not limited to the illustrated configuration.

For example, in an embodiment, components constituting the black box 10 may be installed in the user terminal 20 as needed. Alternatively, in an embodiment, components constituting the user terminal 20 may be installed in the black box 10 as needed. Alternatively, in an embodiment, all components of the recording system 1 for an image and site about a drive may be installed in either the black box 10 or the user terminal 20.

In addition, the components of the black box 10 and the user terminal 20 mentioned below are classified as different components in terms of functions thereof, but in reality, one or more components may be implemented by one processing unit or a program recorded on a recording medium.

The black box 10 may be a recording device installed inside a vehicle to image and record an external environment of the vehicle. The black box 10 may include a position information acquisition unit 110, an image capture unit 120, an image recording unit 130, a controller 140, a sound signal recognition unit 150, a drive recording unit 160, and an interface 170.

The position information acquisition unit 110 may be a unit recognizing vehicle position information. For example, the position information acquisition unit 110 may be provided as a GPS receiver and may receive GPS information. The position information acquisition unit 110 may be built in a housing forming a skeleton of the black box 10. Alternatively, as another example, the position information acquisition unit 110 may be built in a vehicle and the black box 10 may be connected thereto to acquire GPS information.

While the vehicle is driving, the position information acquisition unit 110 may continuously receive and record GPS information. For example, the position information acquisition unit 110 may recognize and record a position of the vehicle at every preset intervals. The position information recognized by the position information acquisition unit 110 may be recorded in an SD card to be described below.

The image capture unit 120 may capture an external environment of the vehicle. To this end, the image capture unit 120 may include a lens exposed to the housing and an imaging device built in the housing and converting information acquired through the lens into an electrical signal.

The image recording unit 130 may record images captured by the image capturing unit 120. The image recording unit 130 may receive an electrical signal from the imaging device and record an image captured by the image capturing unit 120 in a preset format. The image recording unit 130 may be built in the housing of the black box 10.

For example, the image recording unit 130 may record the image captured by the image capturing unit 120 in the form of a video. For convenience of description, hereinafter, a video in which at least a portion of a driving process of the vehicle is captured is referred to as a driving video. In the image recording unit 130, a plurality of driving videos sequentially captured, while the vehicle is driving, may be recorded.

Each driving video may be recorded together with position information of a position in which the video was captured. More specifically, the driving video may be recorded together with position information in a position (a start location) of the vehicle when video capturing starts and position information in a position (an end location) of the vehicle when the video capturing ends.

The driving video may be recorded to have a preset running time. In addition, an end position of the driving video captured and recorded immediately before and the start position of the driving video captured immediately after may be set to be the same or adjacent to each other.

Meanwhile, the image recording unit 130 may include a recording medium for recording images. Such a recording medium may be provided as, for example, an SD card. The SD card may be mounted through a recess formed in the housing.

The controller 140 may be a processing unit that controls the image capturing unit 120, the image recording unit 130, the drive recording unit 160, the interface 170, and the like in response to various inputs and signals. For example, the controller 140 may control other components of the black box 10 in response to an operation of the interface 170. Alternatively, the controller 140 may change contents displayed on a screen included in the black box 10 (hereinafter, referred to as black box screen) according to an operation of the interface 170.

The sound signal recognition unit 150 may be configured to recognize a sound signal generated from the outside. For example, the sound signal may be a preset command. Alternatively, the sound signal may be a sound higher than a certain decibel. In this case, the predetermined decibel may be a value set in consideration of an impact sound of a car accident.

When a preset sound signal is recognized, the sound signal recognition unit 150 may output a corresponding recognition signal to the controller 140. The controller 140 may control each component of the black box 10 so that a drive record is recorded in the drive recording unit 160 based on the recognition signal. This will be described below.

A drive record may be recorded in the drive recording unit 160 based on the recognition of the sound signal. The drive record may include vehicle position information at the time of recognizing a sound signal and an image captured by the image capturing unit 120 at the time of recognizing the sound signal. The drive record may be recorded on a recording medium like a driving video, or may be recorded on an SD card inserted into the black box.

For example, a video captured by the image capturing unit 120 may be displayed on the black box screen in real time, and when a sound signal is recognized, the controller 140 may screen-capture a still image displayed on the black box screen and includes the still image in the drive record.

The interface 170 may be configured to provide a user interface of the black box 10. For example, the interface 170 may include a touch screen panel connected to the black box screen, a switch formed on the housing, and the like.

The interface 170 may provide an input for deleting drive records and driving videos stored in the SD card. Also, the interface 170 may provide an input for starting or ending image capturing by the image capturing unit 120.

The user terminal 20 may be an information processing unit capable of wired and/or wireless communication with the black box 10. The user terminal 20 may be a personal information processing terminal, such as a desktop, laptop, smartphone, or PDA.

The user terminal 20 may receive necessary information from the black box 10 based on wired/wireless communication. For example, the user terminal 20 may load information recorded on the SD card in a wired/wireless communication manner. The user terminal 20 may include a driving route generating unit 210, a video mapping unit 220, a display unit 230, and a record display unit 240.

First, the driving route generating unit 210 may be configured to generate a driving route of a vehicle. In order to generate the driving route, the driving route generating unit 210 may load a plurality of position information acquired while the vehicle is driving. The driving route may be modeled in the form of a line having a thickness representing a moving route of the vehicle.

Meanwhile, the driving route generating unit 210 may load a map around the position information in order to provide surrounding information of the driving route together. At this time, the map may be loaded based on position information loaded from the black box 10. For example, the user terminal 20 may have a map recorded in advance or receive a map through the Internet.

The driving route generating unit 210 may generate a driving route model based on the generated driving route and the loaded map. In detail, the driving route generating unit 210 may identify a portion indicated by the driving route on the map by matching position information, which is a basis for generating the driving route, to a point on the map. Thereafter, the driving route generating unit 210 generates a driving route model in which the driving route is mapped on the map. The driving route model may be a two-dimensional (2D) image model in which a driving route is mapped on a map. For example, the driving route model may be implemented in a KML file format.

The driving route generating unit 210 is a component that maps driving videos to driving routes appearing in the driving route model. In more detail, the video mapping unit 220 may map a video obtained by capturing a section route to each section route constituting the driving route. This will be described in detail with reference to FIG. 2.

The display unit 230 may include a screen (hereinafter, referred to as a user terminal screen) of the user terminal 20 and display information on the user terminal screen. In addition, the display unit 230 may change the contents displayed on the user terminal screen in response to contents input through an input unit of the user terminal 20. For example, the input unit may be a keyboard, mouse, touch screen, or the like.

A dedicated application or program for generating, loading, and displaying a driving route model on a screen may be recorded in the user terminal 20. The user may generate a driving route model after executing the dedicated application or program. In addition, the user may load the generated driving route model, display the same on the screen, and play a mapped video. Details thereof will be described below with reference to FIG. 3.

The record display unit 240 may display a record point on the driving route model so that the record point may be visually recognized. Here, the record point may be a position at which a sound signal is recognized. To this end, the record display unit 240 may be set to load a drive record or configured to receive a drive record from the user. The record display unit 240 may distinguish between record points by using position information included in a drive record. By means of the record display unit 240, the record point may be marked and distinguished from other points on the driving route. Details thereof will be described below with reference to FIG. 3.

FIG. 2 is a diagram illustrating mapping of a video to a driving route by a recording system for an image and site about a drive according to an embodiment of the present disclosure.

As shown in FIG. 2, the driving route generating unit 210 may generate a driving route model including a map and a driving route 310. In the example of FIG. 2, the driving route 310 represents a driving route when the vehicle starts from point a, passes through points b, c, and d, and arrives at point e. At this time, for convenience of description, each position is expressed as points a to e, but in reality, each point may be expressed as GPS coordinates.

In the example of FIG. 2, a first driving video 322, a second driving video 324, a third driving video 326, and a fourth driving video 328 may be videos obtained by sequentially capturing the driving route 310. Based on the captured first driving video 322, the second driving video 324, the third driving video 326, and the fourth driving video 328, the driving route 310 may be divided into a plurality of section routes 312, 314, 316, and 318.

In the example of FIG. 2, the driving route 310 may be divided into a first section route 312, a second section route 314, a third section route 316 and a fourth section route 318. This division may be identified in the mapping process of the video mapping unit 220.

The video mapping unit 220 may determine the GPS coordinates of the start and end positions of the driving video, and recognize a portion of the driving route to which the corresponding coordinates are matched. More specifically, the video mapping unit 220 may recognize the start and end positions of the driving videos 322, 324, 326, and 328 in the driving route, and set a section between the start position and the end position as one section route. Thereafter, the video mapping unit 220 may map the driving video to the section route.

For example, after loading the first driving video 322, the video mapping unit 220 may identify point a, which is a start position, and point b, which is an end point, on the driving route 310. Thereafter, the video mapping unit 220 may set a route between the identified points as the first section route 312 and map the first driving video 322 to the first section route 312. Mapping the second to fourth driving videos 324, 326, and 328 to respective section routes 314, 316, and 318 may be performed in a similar manner, so a description thereof is omitted.

FIG. 3 is a diagram schematically illustrating a driving route model and a cover image displayed on a screen of a display unit according to an embodiment of the present disclosure. As shown in FIG. 3, when the user creates and loads a driving route model through the dedicated application or program, a driving route model M as shown in FIG. 3 may be displayed on the screen of the user terminal.

In this case, the driving route model M shown in FIG. 3 may be a driving route model to which a driving video is mapped. The record display unit 240 may display a cover image 410, in which a record point is located in the driving route 310 displayed on the screen may be visually recognized, on the driving route model M in an overlapping manner.

The cover image 410 may include a record point mark 416, an image display region 412, and an address display region 414. The record point mark 416 may be an image indicating a record point on the driving route 310. In the illustrated example, an example is given in the form of the arrow, but the present disclosure is not limited thereto and the record point mark 416 may be expressed in various forms.

The record display unit 240 may define the image display region 412 and the address display region 414 in association with the record point mark 416. A thumbnail image may be loaded and displayed in the image display region 412, and an address of the record point may be displayed in the address display region 414.

Here, displaying in association may mean that the point indicated by the record point mark 416 is a point at which the thumbnail image was captured, and the address of the point indicated by the record point mark 416 is displayed so that the user intuitively recognizes the displayed address.

For example, as shown in FIG. 3, the record display unit 240 may display the image display region 412 and the address display region 414 adjacent to a head portion of the arrow of the record point mark 416. Also, the record display unit 240 may display a tail portion of the record point mark 416 to be adjacent to the record point.

The thumbnail image may be displayed by loading a still picture included in a drive record. In addition, the address displayed in the address display region 414 may be an address identified using position information included in the drive record.

Meanwhile, the user may select a driving route and/or a thumbnail image to play a driving video on the screen. For example, the user may input a section route selection input for selecting a section route and an image selection input for selecting a thumbnail image to the user terminal 20. Such input may be implemented in various manners, such as a touch on a touch panel, an input through a keyboard, and a click using a mouse.

The section route selection input may be an input for the user to select a specific point on the driving route. In this case, a video mapped to a section route including the selected point may be displayed on the screen. The image selection input may be an input for the user to select a thumbnail image. In this case, a video mapped to a section route including a record point may be displayed on the screen.

Here, the section route including the selected point may mean that the coordinates of the selected point (a record point when a thumbnail image is selected) are located between the start point and the end point of the section route.

Hereinafter, a recording method for an image and site about a drive according to an embodiment of the present disclosure will be described with reference to the above description. For convenience of description, the same reference numerals are used for parts identical or similar to those of the embodiment described above, and descriptions of common parts are omitted.

FIG. 4 is a flowchart of a recording method for an image and site about a drive according to an embodiment of the present disclosure. The recording method for an image and site about a drive according to an embodiment of the present disclosure may be implemented using the recording system 1 for an image and site about a drive according to an embodiment of the present disclosure described above.

As shown in FIG. 4, the recording method for an image and site about a drive according to an embodiment of the present disclosure may include an operation (S101) of acquiring position information of a vehicle, an operation (S102) of recording position information of a video and a capture position, an operation (S103) of recognizing a sound signal, an operation (S104) of recording a drive record, an operation (S105) of generating a driving route, an operation (S106) of mapping a video, an operation (S107) of displaying a driving route and a drive record, and an operation (S108) of displaying a selected video.

In operation (S101) of acquiring position information of a vehicle, the user may drive a vehicle and the position information acquisition unit 110 may acquire and record position information according to the driving of the vehicle.

In operation (S102) of recording position information of a video and a capture position, start and end positions of the driving video may be recorded together with the driving video.

In operation (S103) of recognizing a sound signal, the black box 10 may recognize a preset sound signal. For example, the preset sound signal may be a voice signal including a specific keyword or sentence. For example, in this operation, the user may say a preset keyword/sentence, such as "Hi, BG. Write it down here", "Hi, BG.Checkpoint." When the preset keyword/sentence is recognized, the sound signal recognition unit 150 may output a recognition signal based thereon.

In operation (S104) of recording the drive record, the controller 140 transfers a control signal to the drive recording unit 160 in response to the recognition signal. Upon receiving the control signal, the drive recording unit 160 may record a drive record including current position information and a still image.

In operation S105 of creating a driving route, the user may execute a dedicated application or program and load position information acquired and recorded during driving. When the position information is loaded, the driving route generating unit 210 may load a map according to the position information. When the position information and the map are loaded, the driving route generating unit 210 may generate a driving route model.

In operation S106 of mapping a video, the dedicated application or program may load driving videos and then map the driving videos to respective section routes. This operation may be automatically performed after the driving route model is generated. Alternatively, this operation may be performed after an additional input is received from the user.

In operation (S107) of displaying the driving route and drive record, the display unit 230 may display the driving route model and a cover image on the screen of the user terminal. This operation may be automatically performed after video mapping is completed. Alternatively, this operation may be performed after an additional input is received from the user.

In operation (S108) of displaying a selected video, the user may input a section route selection input or an image selection input to the user terminal 20. The display unit 230 may display a mapped video on the screen in response to the input contents.

In the above exemplary systems, although the methods have been described on the basis of the flowcharts using a series of the steps or blocks, the present disclosure is not limited to the sequence of the steps, and some of the steps may be performed at different sequences from the remaining steps or may be performed simultaneously with the remaining steps. Furthermore, those skilled in the art will understand that the steps shown in the flowcharts are not exclusive and may include other steps or one or more steps of the flowcharts may be deleted without affecting the scope of the present disclosure.

What is claimed is:

1. A recording system for an image and site about a drive, the recording system comprising:
   a position information acquisition unit configured to acquire position information of a vehicle;
   a driving route generating unit configured to generate a driving route of the vehicle, based on a plurality of position information acquired while the vehicle is driving;
   an image capturing unit configured to image an external environment of the vehicle;
   an image recording unit configured to record a video captured while the vehicle is driving and position information on a capture position at which the video was captured;
   a video mapping unit configured to map the video to a section route constituting at least a portion of the driving route, based on the position information on the capture position;
   a sound signal recognition unit configured to recognize a sound signal provided as a preset command;
   a drive recording unit configured to record a drive record including position information of the vehicle at a time of recognizing the sound signal, based on the recognition of the sound signal;
   a display unit configured to display the driving route on a screen; and
   a record display unit configured to display a record point, at which the sound signal is recognized in the driving route displayed on the screen, to be visually recognized, by using position information included in the drive record,
   wherein, based on the recognition of the sound signal, the drive recording unit records by further including an image captured at the time of recognition in the drive record,
   wherein the record display unit outputs a thumbnail image on the screen using the image included in the drive record, and the thumbnail image is displayed in association with the record point displayed on the screen, and
   wherein the display unit displays the video mapped to the section route including the record point on the screen, in response to an input for selecting the thumbnail image.

2. The recording system of claim 1, wherein the display unit displays the video mapped to the section route on the screen in response to an input for selecting the section route.

3. The recording system of claim 1, wherein the video includes a plurality of driving videos sequentially captured by the image capture unit,
   the capture position includes a start position of capturing the driving video and an end position of capturing the driving video, and
   each of the plurality of driving videos is mapped to the section route using position information at the start position and position information at the end position.

4. The recording system of claim 1, wherein the record display unit displays an address identified as position information included in the drive record, in association with the record point displayed on the screen.

5. A recording method for an image and site about a drive, the recording method comprising:
   acquiring position information of a vehicle;
   recording a video captured while the vehicle is driving and position information on a capture position at which the video was captured;
   recognizing a sound signal provided as a preset command;
   recording a drive record including position information of the vehicle at a time of recognizing the sound signal and an image captured at the time of recognizing the sound signal, based on the recognition of the sound signal;
   generating a driving route of the vehicle, based on a plurality of position information acquired while the vehicle is driving;
   mapping the video to a section route constituting at least a portion of the driving route, based on position information on the capture position;
   displaying the driving route, a record point, and a thumbnail image on a screen; and
   displaying a video mapped to the section route including the record point on the screen, in response to an input for selecting the thumbnail image, wherein the record point is displayed on the screen based on position information included in the drive record, the record point corresponding to recognized position of the sound signal, and wherein the thumbnail image is provided based on the image included in the drive record, and the thumbnail image is displayed in association with the record point displayed on the screen.

\* \* \* \* \*